(12) United States Patent
Berger et al.

(10) Patent No.: US 11,426,873 B2
(45) Date of Patent: Aug. 30, 2022

(54) SORTING SYSTEM, MOBILE ROBOT, METHOD FOR OPERATING A SORTING SYSTEM, COMPUTER PROGRAM PRODUCT AND COMPUTER-READABLE MEDIUM

(71) Applicant: BYSTRONIC LASER AG, Niederönz (CH)

(72) Inventors: Michael Berger, Bern (CH); Alexandre Paradzinets, Antibes (FR)

(73) Assignee: BYSTRONIC LASER A.G, Niederonz (CH)

( * ) Notice: Subject to any disclaimer, the term of this patent is extended or adjusted under 35 U.S.C. 154(b) by 0 days.

(21) Appl. No.: 17/594,512

(22) PCT Filed: Jun. 5, 2020

(86) PCT No.: PCT/EP2020/065599
§ 371 (c)(1),
(2) Date: Oct. 20, 2021

(87) PCT Pub. No.: WO2020/245339
PCT Pub. Date: Dec. 10, 2020

(65) Prior Publication Data
US 2022/0143653 A1    May 12, 2022

(30) Foreign Application Priority Data
Jun. 7, 2019   (EP) .......................... EP2019/064977

(51) Int. Cl.
*B25J 9/16* (2006.01)
*B25J 11/00* (2006.01)
(Continued)

(52) U.S. Cl.
CPC ............... *B25J 9/1669* (2013.01); *B07C 5/36* (2013.01); *B25J 9/1602* (2013.01); *B25J 9/1679* (2013.01);
(Continued)

(58) Field of Classification Search
CPC ............. B07C 2501/0063; B25J 9/1669; B25J 9/1602; B25J 9/1679; B25J 13/006
See application file for complete search history.

(56) References Cited

U.S. PATENT DOCUMENTS

| 4,738,583 A * | 4/1988 | Macconochie ........ B62D 57/02 901/33 |
| 2004/0162638 A1* | 8/2004 | Solomon .............. G05D 1/0088 700/247 |

(Continued)

FOREIGN PATENT DOCUMENTS

| DE | 102017107357 A1 | 4/2018 |
| EP | 1014241 A1 | 6/2000 |
| WO | 2017/189502 A1 | 11/2017 |

OTHER PUBLICATIONS

International Search Report and Written Opinion, from PCT/EP2020/065599 filed Jun. 5, 2020, dated Aug. 7, 2020.
(Continued)

*Primary Examiner* — Thomas Randazzo
(74) *Attorney, Agent, or Firm* — Workman Nydegger (57) ABSTRACT

In one aspect the invention relates to a sorting system (SortS) for sorting processed parts (P) from a workpiece (W), which has been processed by a laser processing machine (L), in particular a laser sheet processing machine, comprising:—A working table (WT) for supporting the workpiece (W) with the processed parts (P), which have been processed by the processing machine (L),—A fleet of interacting legged mobile robots (MR) for sorting the pro-
(Continued)

cessed parts (P) in a collaborative manner to a target destination.

30 Claims, 7 Drawing Sheets

(51) Int. Cl.
    *B25J 13/00*     (2006.01)
    *B25J 15/00*     (2006.01)
    *G05D 1/02*     (2020.01)
    *B07C 5/36*     (2006.01)

(52) U.S. Cl.
    CPC ........... *B25J 11/005* (2013.01); *B25J 13/006* (2013.01); *B25J 15/0052* (2013.01); *G05D 1/0291* (2013.01); *B07C 2501/0063* (2013.01); *G05D 2201/0216* (2013.01)

(56) References Cited

U.S. PATENT DOCUMENTS

| | | | |
|---|---|---|---|
| 2017/0259376 A1* | 9/2017 | Beransky | B23K 26/0838 |
| 2018/0154400 A1 | 6/2018 | Jain et al. | |
| 2018/0312023 A1* | 11/2018 | Braithwaite | B60F 5/00 |
| 2019/0072931 A1* | 3/2019 | Bank | B25J 9/1679 |
| 2020/0039590 A1* | 2/2020 | Zhao | B33Y 80/00 |
| 2020/0306964 A1* | 10/2020 | Neville | B65G 57/24 |

OTHER PUBLICATIONS

International Preliminary Report on Patentability, from PCT/EP2020/065599 filed Jun. 5, 2020, dated Sep. 2, 2021.

\* cited by examiner

SORTING SYSTEM, MOBILE ROBOT, METHOD FOR OPERATING A SORTING SYSTEM, COMPUTER PROGRAM PRODUCT AND COMPUTER-READABLE MEDIUM

The present invention relates to sorting cut parts from a workpiece to different target destinations, wherein the cut parts have been processed by a processing machine, in particular a laser sheet processing machine. In particular, the present invention relates to a sorting system, a mobile robot, a method for operating a sorting system and to a computer program and a respective product.

In state of the art a general main approach is known for sorting processed parts from a working table of a e.g. laser cutting machine. This approach is based on systems with a movable gantry, which is moved with respect to a working table with the processed parts, so that robotized hands may grip and pick the parts and place them on a feeding tray. For example, EP 2 164 678 A2 shows such a sorting system with a bridge or gantry and attached sorter arms (for loading/unloading sheets). This document discloses to use a pair of rails, supported at a preset height above a feeding tray of the cutting center, whereon at least one Cartesian robotized hand is movably mounted, capable of moving along horizontal axes X and Y as well as along a vertical axis Z, mutually orthogonal, and comprising at least two bridge cranes sliding along said rails each of which supports at least one pair of robotized hands, and said robotized hands have an electromagnetic pick-up head which may be coupled with a suction-cup device. The feeding tray consists of bars whereon small tesserae of ceramic material are fitted.

However, the disadvantage of the prior art system is its low sorting/un-loading speed. In particular, in case the throughput of the laser processing machine is higher than that one of the subsequent sorting systems, this leads to idle times in the automation process. In particular, for very high cutting speeds that fiber laser technology allows, there is a risk that the unloading of completed parts and skeletons are unable to keep up, causing bottlenecks and reducing productivity. In such cases, maximizing the capabilities of the machine requires an effective material handling and sorting system.

It is therefore a task of the present invention to provide a solution for efficiently sorting and transporting processed parts to target destinations and to overcome the drawbacks of prior art systems, mentioned above.

This task is solved by a sorting system, a mobile robot, a method for operating such a sorting system, a computer program and respective product and a computer readable medium according to the appended independent claims. Advantageous aspects, features and embodiments are described in the dependent claims and in the following description together with further advantages.

In one aspect the invention relates to a sorting system for sorting or transporting parts to dedicated destinations and in particular, processed parts, which have been processed by a processing machine, in particular a sheet processing machine, like a laser cutting machine. The parts are provided by the machine in the workpiece and need to be transported from or out of the workpiece to several possibly different target destinations. The sorting system comprises:

A working table for supporting the workpiece with the processed parts, which have been processed by the processing machine;

A fleet of interacting mobile robots, preferably legged mobile robots, for sorting the processed parts in a collaborative manner to a target destination, in particular remote from the working table. The fleet of mobile robots might be homogeneous (with same structure and/or functionality) or heterogeneous (different architecture and/or functionality). In this respect, it is to be noted that the term "robot" in this document, always refers to mobile robots, in particular legged mobile robots (also in case the word "mobile" is not explicitly mentioned).

One important aspect is to use a fleet of autonomous mobile robots for sorting cut parts. The fleet of mobile robots may be controlled by different methodologies, which will be described below in more detail. With this sorting system described herein, including mobile robots for removing parts, the system gets more flexible and also unloading and sorting speed is enhanced by far. In particular, the picking or gripping of parts is not limited to a gripping from above. By contrast, it is possible to provide other gripping means, e.g. from the side or even from below of the workpiece or part. Another advantage is that even in case of failures (tilted part, not completely cut part) the part may be processed. Further, due to the sensor system, the failure may be detected during the sorting process, which includes a further quality control after the end of the cutting process. The failures may be stored and fed back to a central control or to the cutting machine. Further, additional quality analysis measures may be provided. In particular, an edge detection analysis is provided, which is based on optical sensor signals during the sorting process in order to analyze the cut edge.

In the following the solution of this object is described with respect to the claimed sorting system. Features, advantages or alternative embodiments herein can be assigned to the other claimed objects (e.g. the method, the mobile robot, the computer program product) and vice versa. In other words, claims for the apparatuses can be improved with features described or claimed in the context of the methods and vice versa. In this case, the functional features of the method are embodied by structural units, in particular microprocessor units of an integrated circuit of the device and vice versa, respectively. This is possible, because, generally in computer science, a software implementation and a corresponding hardware implementation are equivalent. Thus, for example, a method step for "storing" data with control instructions for the mobile robot may be performed by means of a storage unit and respective instructions to write data into the storage. For the sake of avoiding redundancy, although the device may also be used in the alternative embodiments described with reference to the method, these embodiments are not explicitly described again for the device.

According to a preferred embodiment, an edge detection mechanism may be provided for the mobile robot, which detects the state of the edge as status quo after being gripped or picked up within the sorting process by means of a sensor system. The detected signals, in particular optical sensor signals and/or weight sensor signals, are received on the mobile robot. In another preferred embodiment, the received sensor signals are processed locally on the robot or on another instance for controlling the gripping and sorting process. Particularly, the signals may be compared to the cutting plan as target status. In case of deviations between status quo and target status, a failure signal may be provided in a feedback control loop to a control unit and may be forwarded to the cutting system as well. In another preferred embodiment, the two different types of sensor signals (optical and weight) are used for validation. If the first signal reveals an inconsistency or an anomaly and before issuing a failure signal, the second signal is analyzed in order to validate the determined inconsistency or anomaly. Subsequently and only after validation, the failure signal may be provided. This feature improves quality and avoids false positive failure or warning signals.

According to a preferred embodiment, the sorting system may comprise a central control unit for at least partially coordinating the control of the sorting process and wherein all or a selected set of the mobile robots is equipped with a control interface to the central control unit. The central control unit may further be interacting with other controllers, like a controller of the automation system, machine controllers, e.g. for the laser machine, motors for the working table, motors for feeding trays etc. The central control unit is responsible for control of the fleet of the mobile robots in a common manner for collaboration.

According to another preferred embodiment, the sorting system is controlled by a distributed system of control units, which are provided locally on the autonomously operating mobile robots. This refers to a decentralized and distributed control of the mobile robots. Different synchronization mechanisms may be used. In particular, the sorting system does not comprise a central control unit but is exclusively controlled by the distributed system of decentralized control unit on the mobile robots.

Also, both of the embodiment mentioned above (decentralized and centralized control) may be combined.

According to another preferred embodiment of the sorting system, at least two mobile robots exchange collaboration messages for building a cooperating team of robots by applying a consensus algorithm for cooperating behavior (in particular with respect to communication and cooperated actions, i.e. common gripping and common transporting), wherein the collaboration messages comprise:
 a collaboration request message set,
 an availability response message set (including information about the time, required to arrive on a collaboration spot),
 an initialization message set and/or
 a synchronization message set.

In particular, with the consensus algorithm the initiating robot becomes a master in a cooperating team and all the other cooperating robots become a kind of mechanical extension to the master (as it was a single robot with extended mechanics).

In case of a centralized control unit, a special message, which may be thought of as "ticket" may be generated and distributed for a part requiring collaboration with other mobile robots, e.g. because the part is too heavy or too big to be gripped and/or transported by one single mobile robot. In response to that ticket, feedback is received from the other mobile robots of the fleet of mobile robots with respect to availability (of a particular robot), time required to arrive on a collaboration spot. A dataset with this kind of feedback information, mentioned before, is aggregated and sent to the control unit. In order to organize the collaboration a control instruction (set) is generated based on a collaborative algorithm. This control instruction set is distributed according to the working tickets to the fleet of mobile robots (one of them may be assigned a master mobile robot, and one or more others slave mobile robots). The master mobile robot is instructed to initiate collaboration on the spot of collaboration by steps of:
 initialization
  Identify the robots that could potentially form the collaborative team
  Send collaboration request and gather acknowledge answers
  Select the suitable robots according to possible criteria (e.g. shortest distance, adequate capacity)
  Master robot initiates the team forming process with selected slave robots
 synchronization.
  Master robot acquires the exact position of each slave robots including motion sensors positions (legs, clamps etc).
  Master robot integrates the slave robots into its internal mechanical model as a mechanical extension (e.g. additional legs, clamps etc)
  The whole collaboration system starts to operate as a single virtual multi-unit robot controlled by the master
 dissociation
  Master robots initiates the dissociation upon completion of the collaborative operation
  Each slave robot restarts its autonomous operation According to another preferred embodiment of the sorting system, it comprises at least one ramp for facilitating the movement of the mobile robots to and from the working table. In particular more ramps are provided, and one ramp may be assigned for inward movement and one ramp may be assigned for outward movement of the mobile robots in order to facilitate control of the sorting system with a plurality of robots and to allow for a continuous line of mobile robots moving to and from the working table.

According to another preferred embodiment of the sorting system, it may comprise a plan interface for receiving a cutting plan and/or a sorting plan and wherein the plan interface is preferably implemented on all or a selected set of the mobile robots.

Preferably, the plan interface serves to receive a cutting plan and based on the received cutting plan, a sorting plan may be generated automatically. This may be done, by executing a sorting plan algorithm, which may be deployed locally on all or a selected set of robots. The sorting plan may also be received from an external instance, e.g. a control unit (of sorting system) or a control unit of laser processing machine etc.

According to another preferred embodiment, the sorting system may comprise a navigation system. The navigation system may be distributed and provided locally on all or a set of mobile robots (i.e. their electronic control units), so that at least a part of the navigation system is preferably implemented on all or a selected set of the mobile robots. The navigation system may be operated in a client-server mode so that resource intensive processing tasks may be transferred to a server instance.

In another aspect the solution described herein refers to a mobile robot for a sorting system as described above. The mobile robot is to be used in a fleet of interacting mobile robots for sorting processed parts (e.g. cut parts) of a workpiece, which has been processed (e.g. cut) by a sheet processing machine (e.g. laser cutting machine or another sheet processing machine). The mobile robot comprises:
 An electronic control unit (may be equipped with memory for storing a computer program). The control unit may be a microcontroller, an ASIC, an FPGA or may be provided in an embedded form as part of a machining component. The control unit is configured for providing control instructions for controlling the mobile robot. The control instructions relate to a movement task and/or to a communication/message transfer task (i.e. for synchronization).

A sensor system (in particular comprising optical sensors and/or position sensors and/or pressure sensor or other kind of sensors for detecting physical parameters) with first sensors for coordinated navigation with the other mobile robots of the fleet and with second sensors for gripping. The mobile robot's main optical sensors of an optical sensor vision system may preferably be located on the mobile robot's core body and auxiliary optical sensors may be located on each leg and preferably on clamping means thereof.

A network interface for communication (message transfer) with other mobile robots; (e.g. Wi-Fi/IEEE 802.11, ZigBee, infrared/IR, radio frequency based, Bluetooth or other wireless communication protocols, like Lora Wan (Long Ranged Wide Area Network). The communication processes may be executed by a communication system, provided on the mobile robot.

A gripping and movement unit for gripping at least one processed part from the working table (so that the mobile robots are engaging with the working table such as to remove the cut parts and to separate the cut parts from the workpiece so that after all cut parts have been removed, a residual grid will remain) and for moving the mobile robot for sorting or transporting the gripped processed part to a target destination.

In a preferred embodiment of the mobile robot, the mobile robot is a legged mobile robot. The gripping and movement unit may comprise at least four legs and in particular six legs, wherein each leg may be provided with a (working) tool of a set of different tools. The gripping and movement unit with the legs serve three different functionalities:

1. to move and
2. to fixate/clamp the mobile robot and
3. to grip the processed parts.

Thus, three functionalities are provided in one single unit. The gripping and movement unit is therefore multi-functional and may comprise subunits. All legs may be equipped with the same tools or with different tools, like clamping means, gripping means, walking means, cutting means (e.g. for separating micro joints between a part and the workpiece). At least one leg may be (multiple or single) telescopic. The legs may be and are preferably electromagnetically controlled. A walking motion algorithm, e.g. a known gait-algorithm, controls all movements of the mobile robot, including walking on flat and non-flat surfaces. In the context of controlling the walking motion and in particular to gait algorithms it is referred to "*A free gait algorithm for quadrupedal walking machines*, Shin-MinSong, Yaw-DongChen, *Journal of Terramechanics*, Volume 28, Issue 1, 1991, Pages 33-48". The walking motion algorithm preferably comprises gripping and clamping at a support member of the working table. The support member may be a grate-like support member with dents, projecting vertically in an axis perpendicular to a plane of the workpiece. In general, the walking motion algorithm is a coordinated motion algorithm for assuring coordinated behavior with the rest of the robots.

According to another preferred embodiment of the mobile robot, at least a part of the legs of the gripping and movement unit are configured to move the mobile robot and to grip and carry parts and to fixate the mobile robot in a stable position. Thus, three different functionalities (gripping parts and carrying/transporting them and fixing the robot itself on the working table with its specific grate structure) are combined in one single component, which safes to reduce weight and volume of the robot.

In another preferred embodiment of the mobile robot, the gripping and movement unit (and in particular the legs thereof) comprise/s clamping means for engagement with a grate-like support element of the working table for supporting (and securely positioning) the mobile robot in a stable position on the working table. The clamping means may be provided as pivotable legs on which a clamping force may be applied, and which may be equipped with rubber pads for avoiding slippage.

In another preferred embodiment the gripping and movement unit of the mobile robot comprises three separate units: a gripping unit, a movement unit and clamping means. The units may be controlled and operated separately and in particular independently of each other, so that the robot may be controlled to be moved, while no gripping and no clamping task is executed. Alternatively, the gripping unit, the movement unit and the clamping means may all be provided in one common structure. However, still, the three units/means may be controlled separately.

Preferably, the gripping unit comprises suction cups, in particular vacuum suction cups for gripping the parts. This simplifies the gripping tasks. The gripping unit may alternatively or additionally be equipped with a metal cutter or metal shear in order to cut micro joints.

In another preferred embodiment, the control unit is adapted to calculate a center of gravity of the mobile robot while gripping the processed parts and for providing tilt avoidance control instructions to avoid tilting/tipping of the mobile robot while it is transporting a cut part. Tilting/tipping control instructions preferably include instructions to clamp with at least one clamping means on a fixed part of the working table, e.g. on a grid.

Preferably, the mobile robot comprises a charging port, preferably a wireless charging port. But generally, the charging port could also be wired. The charging port is adapted to engage with a charging station of the sorting system. The robots will be provided with a rechargeable battery.

In another aspect the solution described herein, refers to a method for operating a sorting system as described above for sorting processed parts from a workpiece processing machine, in particular a sheet processing machine, wherein a set of robot-specific control instructions is generated autonomously and locally on each of the mobile robots of the fleet of robots for the respective mobile robot for gripping processed parts from the working table and for transporting the gripped processed parts to a target destination in a cooperating manner.

Preferably, each of the mobile robots is exchanging messages with each other for informing the other mobile robots of the own control instructions (in particular relating to movement path and to gripping task and fixation task, all in a time domain) and/or for being informed about the foreign control instructions of the other mobile robots. details to the control instructions. The control instructions may be generated locally by means of the distributed control unit and preferably by processing the cutting plan and/or the sorting plan (e.g. an xml file).

In another preferred embodiment, each mobile robot of the fleet of mobile robots' exchanges messages in order to enable cooperative operation within the sorting process.

In another preferred embodiment, a mobile robot generates a call for a job order message (task ticket) to be distributed to all mobile robots of the fleet in case the robot is not able to execute or complete its task according to the received control instructions. In particular, such a job order message may be generated in case a part is lost or stuck or tilted or jammed in the "rest grid" or in case of any other difficulties or problems, like problems relating to the gripping and/or sorting tasks or a battery fault etc. For example, the part may be jammed in the rest grid of the workpiece or e.g. in the grate-like support member of the working table.

In another preferred embodiment, each mobile robot of the fleet of mobile robots uses a coordinate navigation algorithm and in particular a stigmergy algorithm for calculating its movement path dynamically in a changing environment. Navigation should take into account: Collision avoidance, Task allocation, Clustering/Assembling a subset of robot to cooperate on a common task (commonly gripping), collective transport with velocity and trajectory matching. All the tasks and aspects mentioned before may be implemented in a stigmergy algorithm or in a robotics fleet algorithm. Example of such algorithms are mentioned in "Nicole El Zoghby, Valeria Loscri, Enrico Natalizio, Véronique Cherfaoui. Robot Cooperation and Swarm Intelligence. *Wireless Sensor and Robot Networks: From Topology Control to Communication, Aspects*, World Scientific Publishing Company, pp.168-201, 2014. hal-00917542" or in "*Analysis of Algorithms to implement Swarm Bots for Effective Swarm Robotics*, Deepika Rani Kampally, Rashmi Annae, Santhosh Kumar, *IJCSET*/August 2011 I Vol 1, Issue 7, 407-414".

In another preferred embodiment, the navigation process is continuously optimized and wherein optimization consists of an iterative improvement of the currently best solution. The coordinate navigation algorithm considers the ongoing changes in the environment, i.e. the changes due to movement of other robots or already sorted parts etc.

The navigation system may be a distributed system, being deployed on the fleet of robots for controlling and executing a co-operative transport (sorting). The navigation system may execute algorithms for collective transport of a processed part. For collective transport the coordinate navigation algorithm is used. For coordinated navigation algorithms it is referred to literature, like "*Collective transport in large swarms of simple robots, Master Project*—Microengineering Section, Adrian Cabrera de Luis: Michael Rubenstein and Steffen Wischmann, Harvard, *Self-Organized Systems Research and Laboratory of Intelligent Systems* Prof. Radhika Nagpal and Prof. Dario Floreano Cambridge, Mass., USA, Aug. 17th 2012, See page 20, chapt. 4.5". Collective transport is to be construed as a collective behavior in which a group of robots has to cooperate in order to transport an object (like a cut part). In general, the object is heavy and cannot be moved by a single robot, making cooperation necessary. The robots need to agree on a common direction in order to effectively move the object towards the target destination. Collective transport behaviors may be obtained by using probabilistic finite state machines or artificial evolution. Cooperation is obtained either through explicit communication of the desired motion direction, or through indirect communication, that is, by measuring by means of sensors the force applied to the carried object by the other robots .In general, the robots are organized and distributed in space by generating clusters of robots to perform a common task (e.g. gripping a heavy part together) by morphogenesis or self-assembly.

For the purpose of coordinate navigation of the set of robots' neural networks and in particular reinforcement learning techniques or evolutionary computation techniques may be applied.

In a preferred embodiment, the robots' paths are not computed a priori. A solution to the multiple robot path planning problem is a collision-free path in the Cartesian product of the configuration spaces of all the robots of the fleet. A solution to the problem exists if the start and goal configurations belong to the same connected component of the global collision-free configuration space. Searching such a space is a combinatorically difficult problem, which is solved by the coordinate navigation algorithm, e.g. based on phototaxic algorithms.

In general, the navigation system may use an algorithm that coordinates the movement/motion of a set of robots in order to optimize the sorting task over time. In the coordinate navigation algorithms, typically, the individual robots follow three simple rules:
1. collision avoidance,
2. velocity matching and
3. path adaption.

Collision avoidance keeps the robots from colliding one with the other. For this purpose, also different ramps are provided to improve the availability of transportation routes. Velocity matching ensures that each individual robot matches the speed of its neighbors, while e.g. commonly gripping a transporting one (heavy) part and path adaption forces each individual robot to stay close to its neighbors during this common task.

Generally, for achieving cooperating behavior, approaches may be used for consensus achievement. In a first embodiment, direct communication is used: each robot is able to communicate its preferred choice or some related information. In the second embodiment, instead, indirect communication is used: the decision is performed through some indirect clues, such as the density of the robot population, which may be sensed by respective sensors (e.g. optical sensors on each robot). In this context, a stigmergy algorithm may be used. Robots could use a common data exchange infrastructure (e.g. real time density map, space localized message mailboxes (equivalent to pheromones deposits in ant colony)). In this respect it is referred to the paper "*Collision Avoidance and Swarm Robotic Group Formation*, Fan Liu & Ajit Narayanan, *International Journal of Advanced Computer Science*, Vol.4, No.2, Pp. 64-70, Feb., 2014". Two different concepts may be applied:
Iterative peer-to-peer negotiation
Centralized approach with a coordinator Further, task allocation methods need to be applied. Task allocation is a collective behavior in which robots distribute themselves over different tasks (picking/gripping of parts and transporting parts and moving to gripping spots etc.). The goal is to maximize the performance of the system by letting the robots dynamically choose which task to perform. Task allocation may be obtained through the use of probabilistic finite state machines. To promote specialization, the probabilities of selecting one of the available tasks are either different among the robots or they can change in response to task execution or messages from other robots.

In another preferred embodiment, for controlling the navigation of the fleet of mobile robots' neural networks may be used and/or evolutionary computation techniques may be applied (see for example, H. Li, S. X. Yang, M. L. Seto, Neural-network-based path planning for a multirobot system with moving obstacles, IEEE Transactions on Systems, Man, and Cybernetics, Part C (Applications and Reviews), 39 (2009) 410-419).

In another aspect the invention relates to a computer program product comprising program elements which induce a processor in a mobile robot to carry out the steps of the method for sorting processed parts from a workpiece processing machine according to the method, described above, when the program elements are loaded into a memory of the processor.

In another aspect the invention relates to a computer-readable medium on which program elements are stored that can be read and executed by a processor, in order to perform steps of the method for sorting processed parts from a workpiece processing machine as described above, when the program elements are executed by the processor.

The realization of the invention by a computer program product and/or a computer-readable medium has the advantage that already existing machinery and hardware can be easily adopted by software in order to work as proposed by the invention.

In the following a short definition of terms used within this application is given.

The term "sheet processing machine" refers to a processing machine for processing sheet material, in particular e.g. metal sheet or tube made from sheet material. The machine may be adapted to process two and or three-dimensional workpieces on a numerically controlled machine, more particularly a CNC machine, e.g. by means of cutting tools and a laser machining device comprising a laser machining head, a laser source with attached beam forming means and beam guide for generating a laser beam and supplying it to the laser machining head for the purpose of cutting, bending, or processing.

The term "working table" means a 2-dimensional support element for providing the workpiece with the processed (e.g. cut parts) and the rest of the workpiece, forming a residual grid structure (without the cut parts). The working table may be a cutting table, movable inside and outside of the processing (cutting) machine. It may be a shuttle table (Wechseltisch), i.e. it may be formed as a changing table, such as to be movable and/or loadable independently of the machining device. The working table is provided with the processed workpiece (with the cut parts) from e.g. the laser cutting machine.

After having removed all cut parts from the workpiece, so that only the residual grid is remaining, the residual grid will be removed from the working table, while another (new) workpiece is provided for the sorting task. One and the same working table can be used in various machines. The working table has horizontal support elements, extending orthogonally to a longitudinal axis of the working table. The support elements may have a modified rectangular side view, wherein the upper side is toothed or jagged in order to minimize the contact area with the workpiece.

The mobile robot is a movable electronically controlled robotic operating tool, which is preferably autonomously controlled. Preferably, the mobile robot is legged. The legs comprise a gripping and movement unit and serve for gripping parts and moving and clamping the mobile robot. The mobile robot is adapted to move autonomously and actively and therefore comprises at least one drive motor for moving the robot. The drive motor(s) are controlled by control instructions, received from a processing unit (internal or external). The mobile robot actively moves and therefore does not need a support member, like a gantry (for limited pre-defined movement).

The mobile robot may comprise a gripping and movement unit. The gripping and movement unit is multi-functional. The gripping and movement unit is configured to move the mobile robot and to grip and carry or transport parts and to fixate the mobile robot in a stable position during a gripping task. Thus, three different functionalities (gripping parts and carrying/transporting them and fixing the robot itself on the working table with its specific grate structure) are combined in one single component, which safes to reduce weight and volume of the robot.

The mobile robot comprises a control or processing unit (electronic circuit for data processing). It is preferably operated in a fleet of cooperating robots and their processing units. All the local control units of the fleet of mobile robots are forming a distributed (decentralized) control unit being in data exchange with each other. The control unit serves to provide control instructions for controlling the mobile robot, inter alia with respect to its gripping and movement tasks and communication tasks within the fleet. Each mobile robot represents an agent in a software system. The agent is and acts autonomous, proactive and reactive, robust and adaptive with respect to the changes in its environment (with respect to the processed parts and with respect to the other robots). In a preferred embodiment each or a predefined subset of mobile robot(s) of the fleet of mobile robots exchanges messages with each other in order to enable cooperative acting within the sorting process. Preferably, the processing unit of the mobile robot may be configured to execute a consensus algorithm or a collaboration algorithm.

The movement task of each of the mobile robots is not pre-defined or pre-programmed, but is controlled on-the fly by executing a coordinate navigation algorithm and/or an allocation algorithm with respect to the movement task.

In a preferred embodiment, the mobile robot is configured to fixate itself in a stable position on a grating structure (which is not a plane or a normal working platform but is grid or a grate structure). The grating structure may be part of or based on a working table of a laser processing machine with cut parts thereon. Therefore, and for this purpose, the mobile robot may comprise clamping means. The clamping means may be provided in addition to a gripping and/or a movement unit. In another embodiment the clamping means may also be configured to act as gripping and/or movement unit as well.

In still another preferred embodiment, the mobile robot is equipped with (preferably optical) sensors to sense the robot's surrounding and to navigate collaboratively with the other robots.

The mobile robot may comprise a (local, internal) control unit, which serves as distributed and decentralized control unit in the set of control units of the fleet of mobile robots. The distributed control unit is adapted to execute the consensus algorithm.

Optionally and in addition to the local control unit on a mobile robot, a central control unit may be provided for control of the fleet of robots. The central control unit (electronic circuit for data processing) may act as a (central) server and may be adapted to interact with the (local) processing unit of the mobile robots which in turn may act as a (local) client. Each of the local control units of the fleet of mobile robots may execute a collaborative algorithm for joined and collaborative task execution (movement, gripping, clamping).

In a preferred embodiment, a coordinate gripping and/or movement task may be executed. For example, if the cut part is too heavy for being gripped and/or carried by only one single robot, a set of robots may be assigned to commonly execute this task. Instructing each of the robots separately for the common task may be performed by executing the collaborative algorithm.

One important aspect of the invention is to be seen in that the method provides an efficient procedure for removing cut parts in a flexible manner from the working table. Due to the mobile robots, it is possible to apply different gripping techniques, like lifting the cut parts from above, e.g. by means of suction pads, but also by gripping the cut parts from the side. Further, it is possible to grip a processed part in a first section of the workpiece, while other processed parts are gripped in at least a second or third section of the workpiece and wherein the first, second and further sections of the workpiece are not adjacent to each other. This improves flexibility of the removement and sorting process.

The fleet of mobile robots may be controlled by applying a consensus algorithms, i.e. without central control and thus by providing coherent sorting behavior without choreography. Thus, each mobile robot only has localized knowledge. The fleet of mobile robots is to be construed as a set of electronic machining agents that optimizes a function or goal (sorting of processed workpieces) by collectively adapting to the local and/or global environment in a self-organizing manner. The control of the fleet of robots comprises interaction processes. For the control of the robotic fleet particle swarm optimization algorithms may be applied, which are based on simulation models that simulate the behavior of each robot. For example, such algorithms are disclosed in "*Asynchronous Particle Swarm Optimization for Swarm Robotics*, Nor Azlina AbAziza, Zuwairie Ibrahimb, *Procedia Engineering*, Volume 41, 2012, Pages 951-957" or in "*Distributed efficient localization in swarm robotics using Min-Max and Particle Swarm Optimization*, Alan Oliveirade Sáa, NadiaNedjahbLuiza de Macedo-Mourelle, *Expert Systems with Applications*, Volume 50, 15 May 2016, Pages 55-65".

One characterizing aspect of the mobile robot's sorting system is its ability to act in a coordinated manner without the presence of a coordinator or of an external controller, thereby performing some collective sorting and transportation behavior without any individual controlling the set of mobile robots by a central (computing) instance. The term "collective behavior" means behaviors of the set of robots considered as a whole (not individually).

The use of a fleet of robotic systems is appealing since, compared to centralized systems designed for the same task, they have very simple components. Thus, the robotic units could be, in principle, modularized, mass produced, and could be interchangeable and maybe disposable. The second main advantage is reliability: since the fleet in general is highly redundant, the fleet could be designed to survive through many kinds of disturbances (e.g. tilting of cut workpieces, collisions with another mobile robot etc. which could possibly be more severe than those considered in standard control systems); because of redundancy. The fleet has the ability to adapt dynamically to the working environment, e.g. not completely cut parts, which even may be processed by applying an additional tool (e.g. cutting shear) in order to cut the residual joint of the part, so that the part may be gripped and sorted, which otherwise could not be sorted. The fleet of robots acts high reliability. It is possible to envision the mobile robots as acting like a massive parallel computational system and thus carry out tasks beyond those possible to other type of robotic systems, either complex single robots or centralized groups of robots.

Motion planning, coordination and control are essential aspects for deploying the fleet of autonomous robots. These three problems are intrinsically dependent: robot motions must be physically realizable by controls computed by robot controllers and must also be coordinated in order to avoid collisions and deadlocks. Although methods for addressing these problems jointly have been studied in science, the real-world automation application poses further requirements that narrow down the range of methods that can be used, in particular with respect to performance/time and costs. The fleet may include different types of robots or robots which are equipped with different (e.g. gripping, clamping or processing) tools, with fundamentally different control schemes, and robot controllers are often certified black boxes that ship with the robot platform and cannot be modified. In practice, there are many reasons for considering motion planning, coordination and control separately by providing different algorithms to be executed on each of the robots of the fleet.

Generally, automating a fleet of autonomous robots involves solving a multitude of problems. These include allocating tasks to robots, computing feasible robot motions paths to perform the task, and ensuring that these motions are coordinated, all the while maximizing some performance criterion. These can be seen as sub-problems of an overall fleet management problem. A part of the problem is to decide which robot should be assigned to which task; the motions of the robots are constrained by the obstacles in the environment (e.g. tilted parts, or parts that are not completely cut and still having micro joints etc.). The way in which goals are assigned to robots will determine whether and how robot motions should be coordinated. Some methods for solving sub-problems underlying the fleet management problem have been studied in the fields of Artificial Intelligence, Robotics and Operations Research. Deploying existing methods in the specific industrial automation setting therefore requires catering to the particular assumptions, e.g., via additional infrastructure, providing hand-crafted paths via the coordinated navigation algorithm and the walking algorithm, or specifying traffic rules for deadlock and collision avoidance taking into account the ramps and special rules for robot's movement. For example, for avoiding collisions, in one embodiment at least two ramps are provided, one for inward movement and one for outward movement of the robots. Rules are provided in order to issue respective control instructions, considering the assignment of the ramps. This helps to reduce the collision risk between robots.

In a preferred embodiment a central and a decentral control approach are combined. A central control unit is provided and in addition all or selected mobile robots of the fleet of robots are equipped with a decentralized or distributed control unit. Thus, each of the robots is provided with a local control unit and in addition a central control unit is provided for the fleet of robots, too. The solution space is reduced by requiring fixed paths for the robots; with other words it is configured by the central control unit that the robots have to move along fixed paths. However, the navigation and traffic within these respective paths are managed in a decentralized manner locally on the distributed control units of the robots.

In a preferred embodiment, an interaction protocol is provided for message transfer, signaling and robot-to-robot interactions. Preferably, the robots' sensing and communication capabilities are local, and the robots usually do not have access to global information.

Preferably, an allocation algorithm is used for allocating one robot or a subset of mobile robots for a gripping and transporting task.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF PREFERRED EMBODIMENTS

Generally, the proposed solution relates to a distributed system of mobile robot's MR for cooperatively transporting cut parts P from a working table WT to a target destination, e.g. different sorting boxes or conveying belts.

Figure 1:
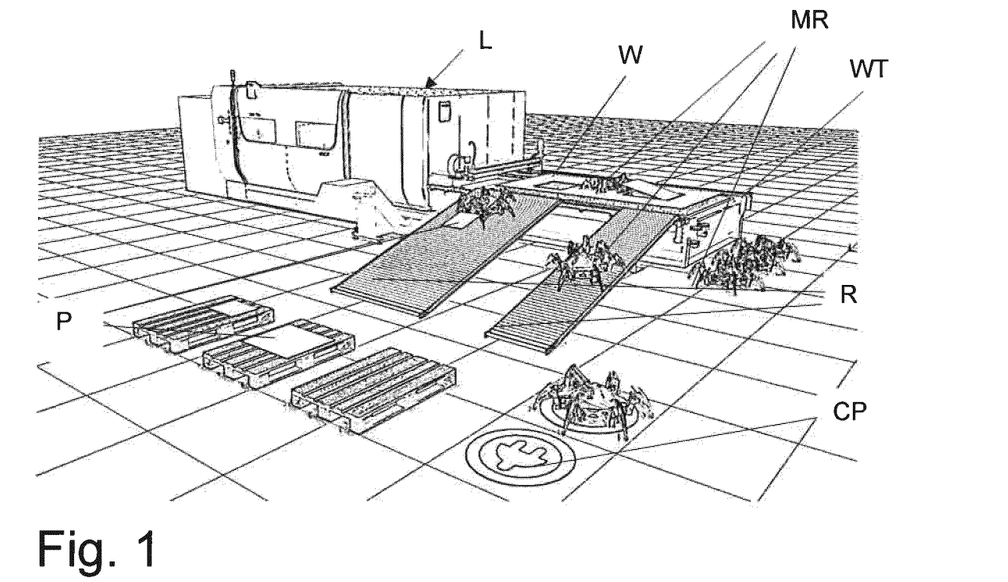
FIG. 1 is an overview of the structure and architecture of the sorting system according to a preferred embodiment of the present invention.

The overall structure is shown in FIG. 1. A processing machine may be a laser cutting machine L, which provides cut parts P in a workpiece W. The laser machine is controlled by an electronic (or digitized) cutting plan. After completion of the cutting process, the workpiece W with the cut parts P formed therein is transferred on a working table WT out of the laser machine L. Now, the cut parts P need to be sorted or transported to a target destination.

As can be seen in FIG. 1, the laser cutting machine L is equipped with a movable cutting table or working table, located outside of the machine in a discharge area with a workpiece W on it. The workpiece W is cut and forms a residual grid and several cut parts P. Legged mobile robots MR perform the unloading of parts P. The legged mobile robots MR are of insect-like shape and have at least three (3) walking legs L, preferably four (4) or more preferably sic (6) walking legs L. At least one of the legs L comprises gripping means G or a gripper extremity. Alternatively, also 2 or 3 gripping means may be provided. Ramps R allow the mobile robots MR to access and exit the working table WT where they walk preferably along the residual grid, on the pins or edge E of the working table WT or on larger cut parts P, which are not in danger of falling through a grate structure of the working table WT. The mobile robots MR collect cut parts P and stock them in a collecting area, e.g. on pallets, in boxes or the like. Wireless charging areas CP (e.g. inductive, optical or electromagnetic) facilitate electrical re-charging of the mobile robots MR. Alternatively, a cable bound charging could be installed.

Figure 2:
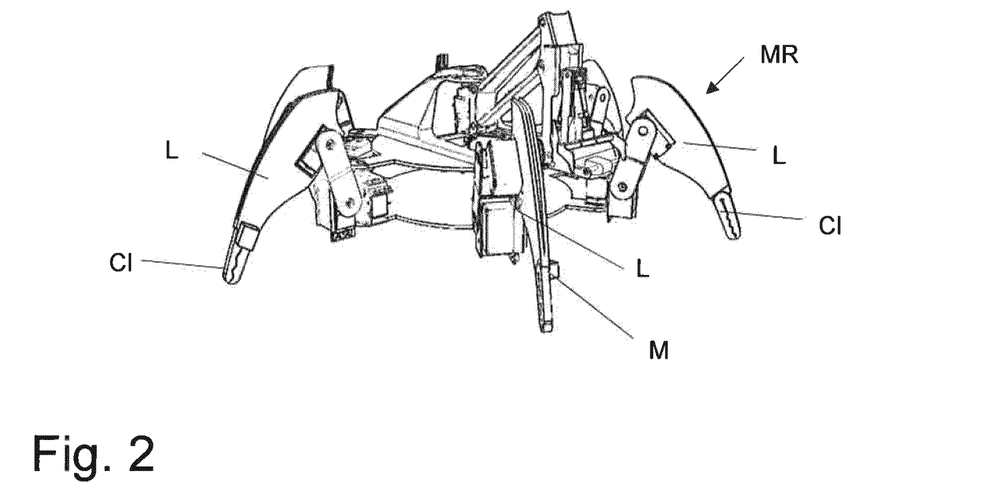
FIG. 2 is a schematic representation of a mobile robot according to a preferred embodiment of the present invention.

FIG. 2 shows a mobile robot MR in more detail. The robot MR has several and at least three walking legs L, equipped with clamps means Cl and clamp motorization M for support grate walking.

Figure 3:
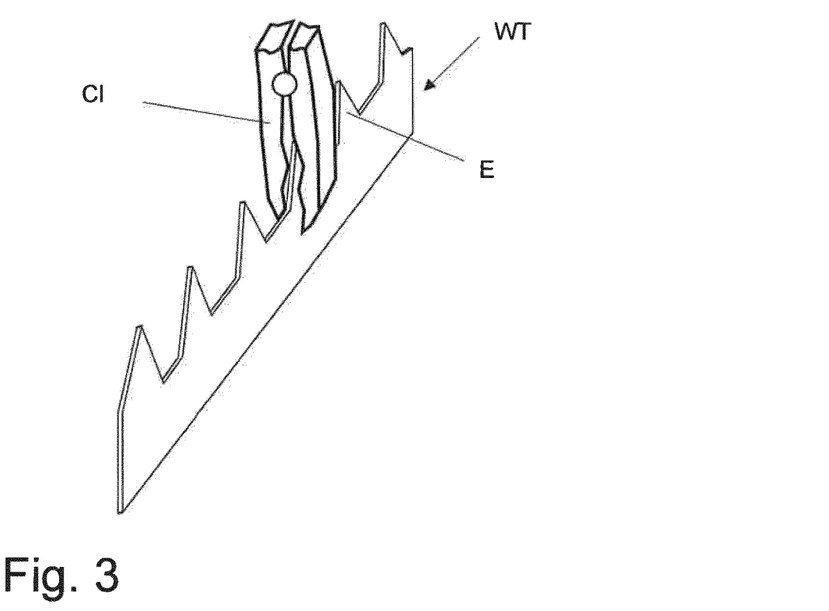
FIG. 3 is schematic representation of a clamping unit of the mobile robot, engaging with a grate-like structure of the working table.

The support grate walking with the respective means is shown in more detail in FIG. 3. The working table WT has several (with respect to the longitudinal axis of the working table WT) transversally extending support elements E, forming a grate. The support elements E have an upper side which is jagged or toothed as can be seen in FIG. 3, for minimizing the contact area with the cut parts P. The mobile robot MR comprises clamping means Cl for engagement with the teeth of the support element E of the working table WT. Thus, the working table WT has a support grate lane with pins or teeth for the engagement with a mobile robot's leg L and in particular with clamping means Cl. Alternatively, to the clamping means Cl, shown in FIG. 3, also cup-like (normal or vacuum suction cups SC) ends of the legs L could be used. Further alternatively, electromagnetic acting leg ends could be used. Possible embodiments for the gripping unit G with different options for clamping means Cl are explained in more detail below with respect to FIG. 8.

Figure 4:
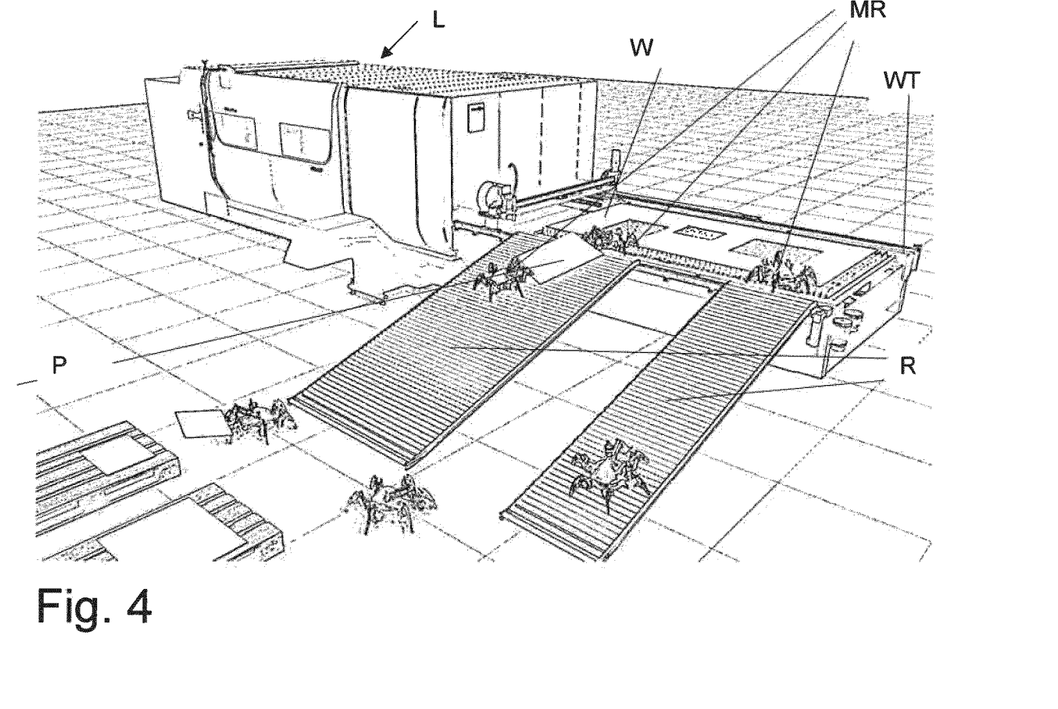
FIG. 4 is another schematic representation of the sorting system with two robots performing a collaborative transportation task of a cut part.

FIG. 4 shows several mobile robots MR with two of them cooperating in a common transportation task of one single cut part P, being too heavy or large for a single robot MR. For this common cooperation task, an allocation and/or a consensus algorithm is used to be executed on the robot's MR to control the two mobile robots MR autonomously in a self-organizing manner. Of course, the co-operative team may consist of two or more mobile robots MR, depending on the respective task. In order to organize the collaboration, a consensus algorithm or a collaboration algorithm is applied and executed. In the fleet of mobile robots one of them may be assigned a master mobile robot, and one or more others slave mobile robots. The master mobile robot is instructed to initiate collaboration on a spot of collaboration.

Figure 5:
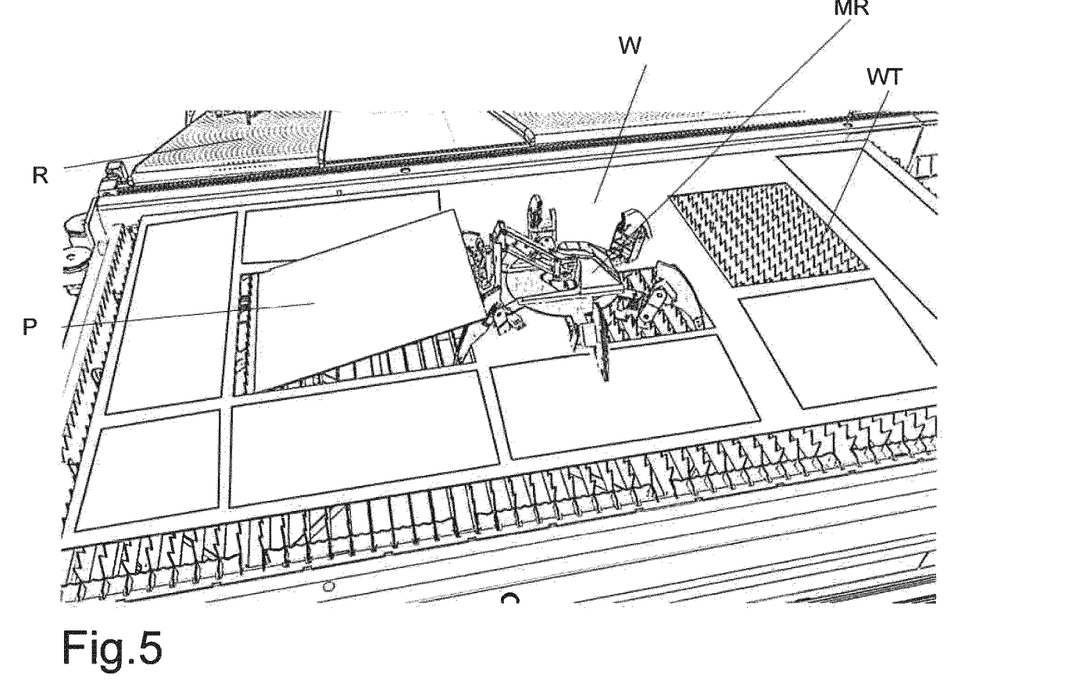
FIG. 5 is a more detailed view of one robot gripping a cut part out of the workpiece on the working table.

FIG. 5 shows the working table WT with the grate-like support element E. The support element E having a workpiece Won it having cut parts P to be transported to the target destination. Mobile robot MR is picking a cut part P to unload.

Figure 6:
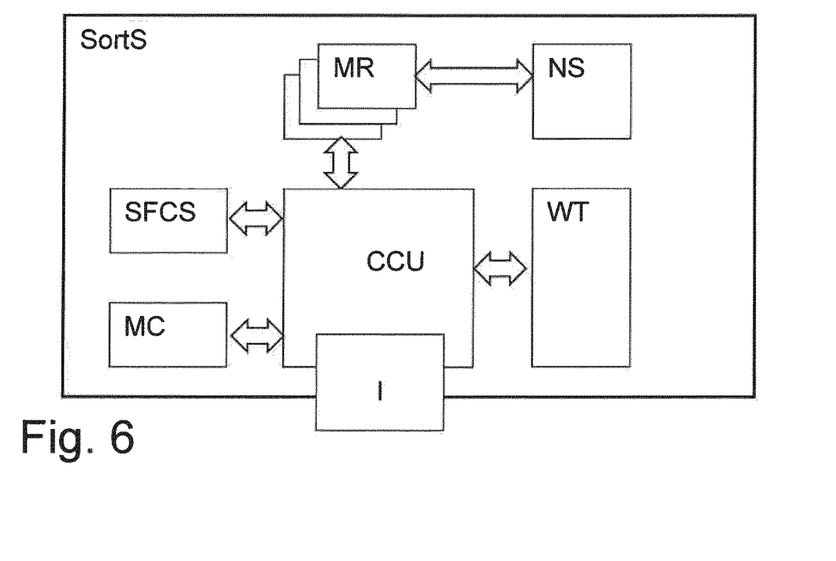
FIG. 6 is a block diagram of components of the sorting system according to a preferred embodiment of the present invention.

FIG. 6 shows a possible embodiment of a sorting system SortS with a central(ized) control CCU. The sorting system SortS comprises a fleet of mobile robots MR, which are in data exchange with each other and with a navigation system NS. The navigation system NS may be an indoor navigation system, e.g. operating with beacons. A central control unit CCU is adapted to control the fleet of mobile robots MR in order to provide a cooperating team of robots for a common task. For that purpose, the central control unit CCU receives information about the following items, by means of different messages:

cut part message;
part production step message;
automation factory topology message;
machine topology message;
local robot's state message, comprising an ID of the robot MR, a type of the robot MR (e.g. weight, dimension, power . . . ), current task of the robot MR, position of the robot MR, charging battery status etc.

The central control unit CCU may be in data exchange with a shop floor control system SFCS (if present) and/or with a machine control MC, which could e.g. be the control of the cutting machine. In case that there is no SFCS communication, it will be with the control unit of the cutting machine. Further the central control unit CCU may exchange messages with a control system of the working table WT in order to synchronize movement of the working table WT with respect to movement of the fleet of robots MR. For providing control instructions for control of the fleet of mobile robots MR, the central control unit CCU may have a plan interface I for receiving a cutting plan and/or a sorting plan.

The central control unit CCU is adapted to execute the collaboration algorithm or at least a server's part thereof (wherein a client's part of the collaboration algorithm may reside and may be executed on a processing unit of each of the mobile robots MR. The central control unit CCU may further be adapted to execute the sorting plan algorithm, the coordinate navigation algorithm, the walking motion algorithm, and/or the allocation algorithm.

Figure 7:
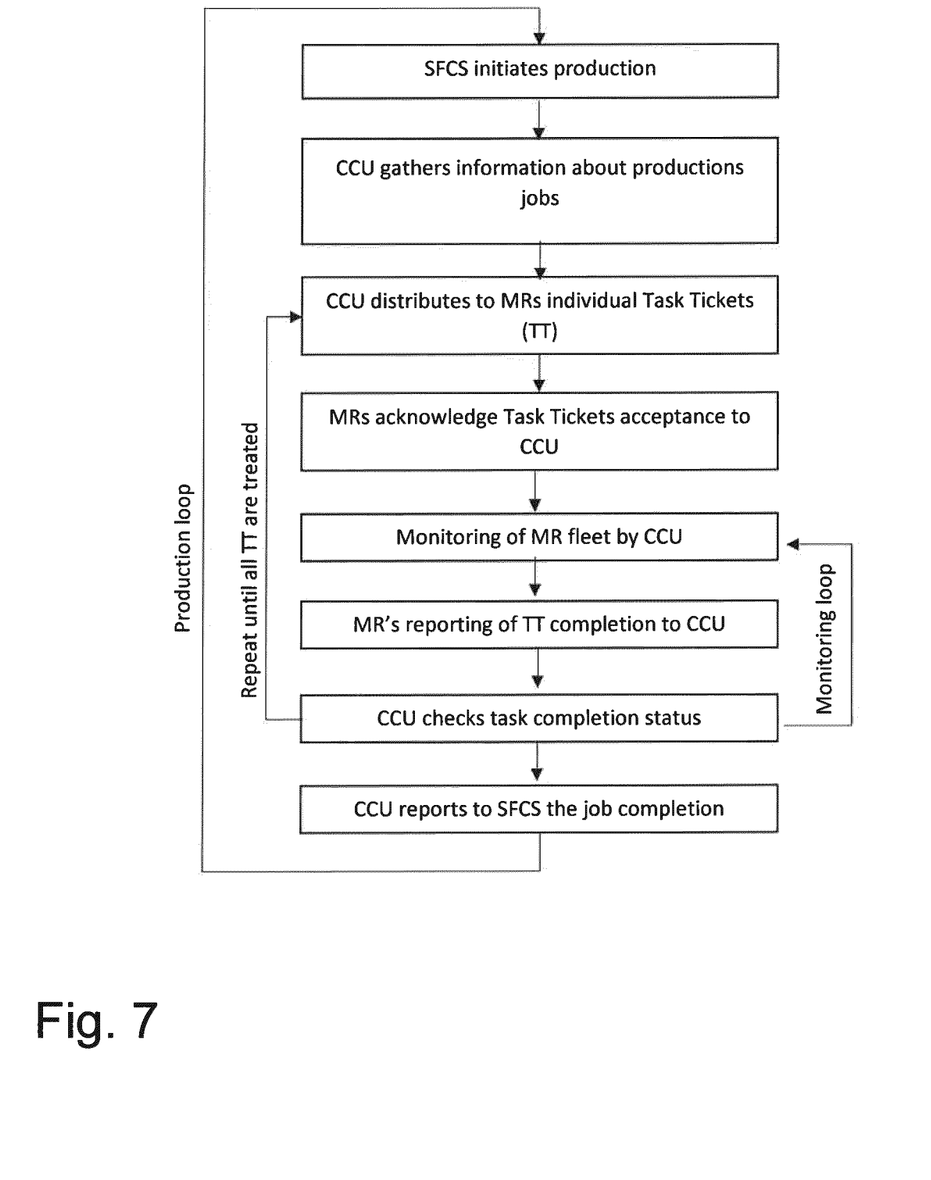
FIG. 7 is a flow chart of a sorting procedure.
Figure 8A:
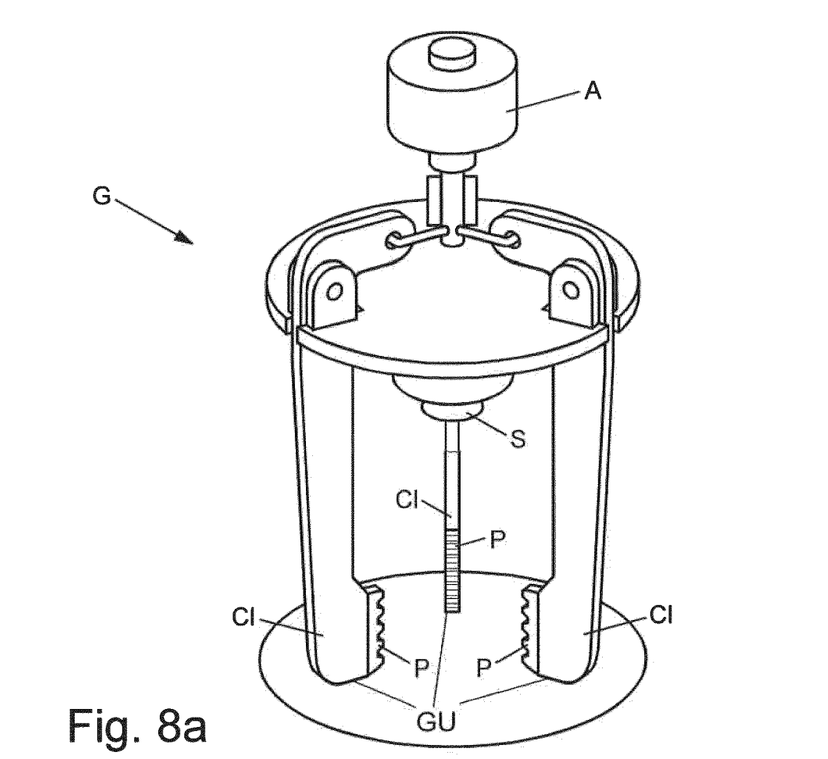
FIG. 8a shows the gripping unit with a 3-jaw clamping means.
Figure 8B:
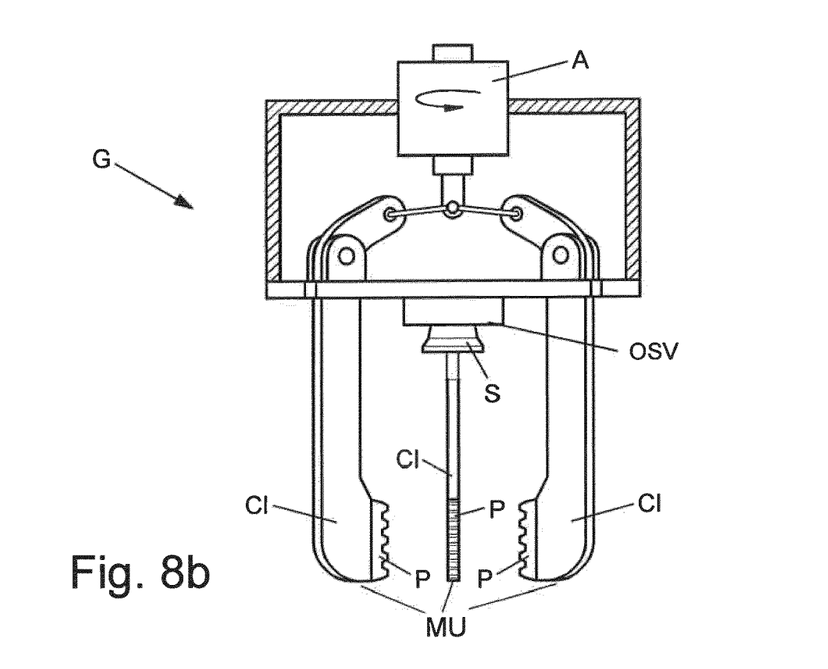
FIG. 8b shows the gripping unit with a rotating clamping means.
Figure 8C:
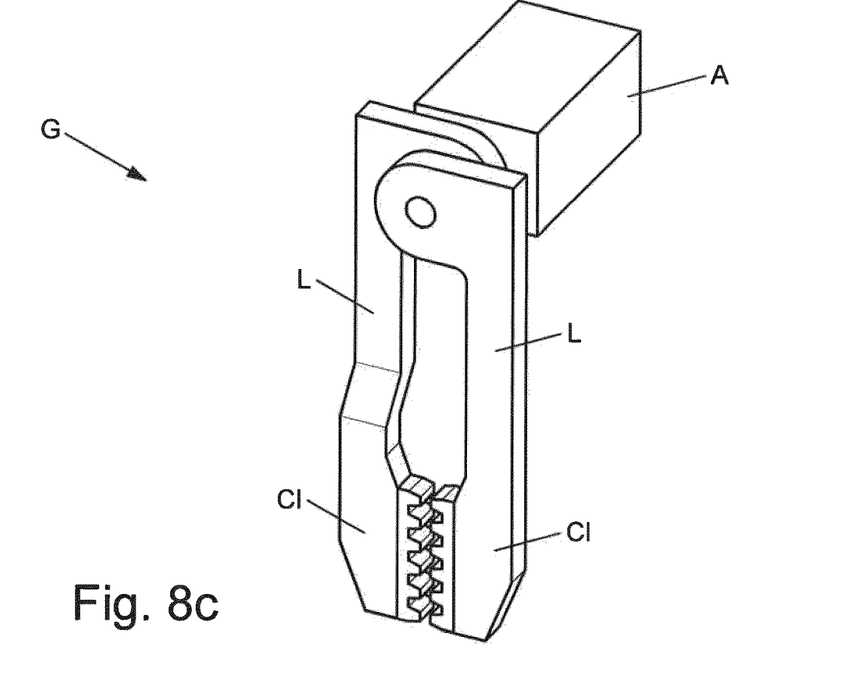
FIG. 8c shows the gripping unit with a 2-jaw clamping means.
Figure 8D:
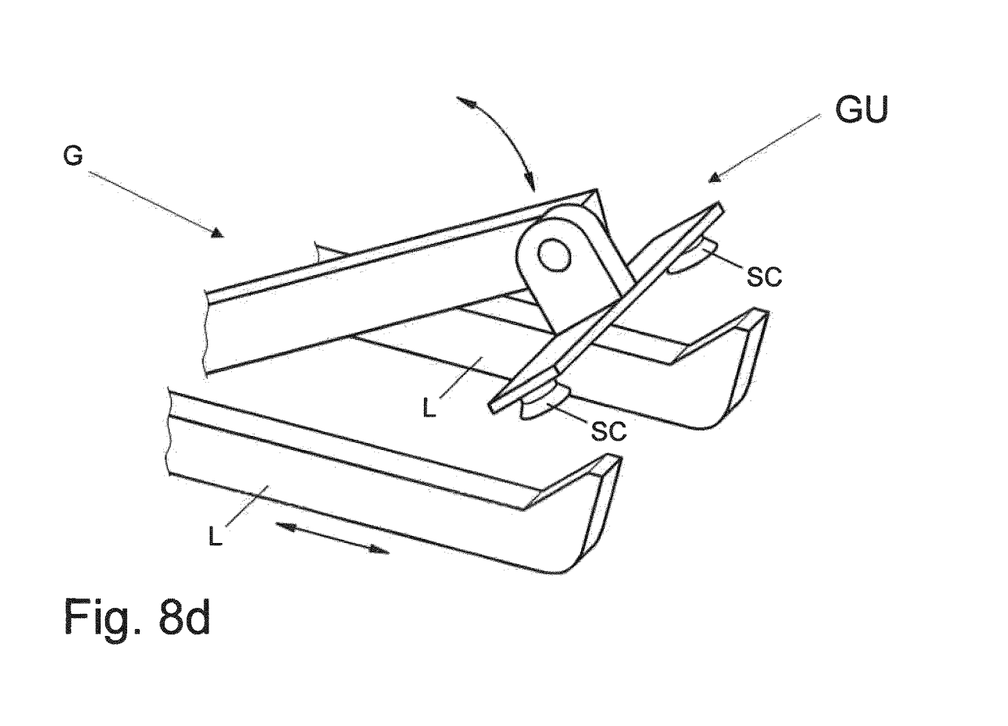
FIG. 8d shows the gripping unit with part gripping clamping means.

FIG. 7 is a flow chart of a control method for a fleet of mobile robots MR. The shop floor control system SFCS or alternatively the control unit of the laser machine L initiates production of cut parts P by initiating cutting process in the laser machine L. The central control unit CCU gathers information about productions jobs (e.g. cutting and/or machining plans and production steps. In a next step, the central control unit CCU distributes individual task tickets TT to the mobile robots MR. In the following step, the respective mobile robot MR acknowledges the task ticket's acceptance to the central control unit CCU. In the next step, the fleet of mobile robots MR is monitored until a mobile robot MR is reporting a task ticket completion message to the central control unit CCU. The central control unit CCU checks task completion status. In case the status represents, that the job is completed successfully, the central control unit CCU reports the job completion to the shop floor control system SFCS or alternatively to the control unit of the laser machine L. Otherwise (no job completion) the monitoring loop is executed for the fleet of robots so that it is branched back to the monitoring step. The task ticket distribution is repeated until all task tickets are processed.

FIG. 8 shows different embodiments for the gripping and movement unit G of the mobile robot MR. FIG. 8a shows the gripping and movement unit G with an actuator A and a 3-jaw clamp, forming the clamping means Cl. The gripping and movement unit G additionally comprises a gripping unit GU. The gripping unit GU has the functionality of gripping processed parts—in addition to the clamping functionality for clamping the mobile robot MR itself on the grate-like support structure, shown in FIG. 3. In this or in other example embodiments, the legs L may be equipped with rubber pads P for avoiding slipping of the gripping and movement unit G. FIG. 8b shows an example embodiment wherein the gripping and movement unit G comprises a movement unit MU. The movement unit MU provides the functionality of moving the mobile robot MR. The gripping and movement unit G may be equipped with a rotating clamping means Cl. The gripping and movement unit G may comprise an optical sensor vision system OSV of the sensor system S, in order to optically observe and control the gripping process by mans of control instructions provided by the control unit DCU, CCU. FIG. 8c shows the gripping unit G with a 2-jaw clamping means Cl and a respective actuator being controlled by the control unit DCU, CCU (this also holds for the other actuators in the other figures of FIG. 8). FIG. 8d shows the gripping means G with the gripping unit GU, which comprises a retractable part for engagement with a leg L, provided with suction cups SC and wherein the leg L with the suction cups SC may be moved up and down a longitudinal axis of the leg L.

Figure 9:
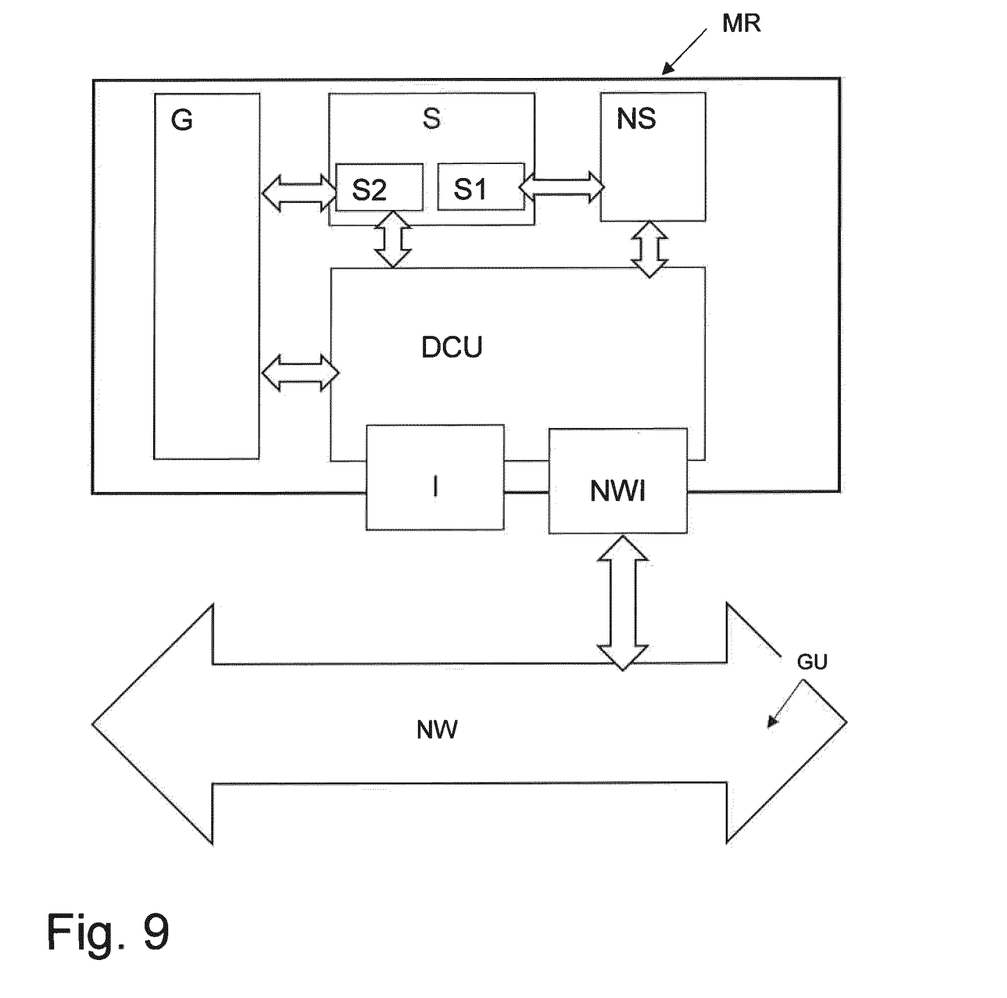
FIG. 9 is a block diagram of components of the mobile robot according to a preferred embodiment of the present invention.

FIG. 9 shows another, preferred embodiment with a distributed control unit DCU compared to the embodiment with the central control unit CCU, described with respect to FIG. 6. However, it is noted, that combination are possible, too. Thus, a central control unit CCU may be provided in addition to the distributed control unit DCU on each or selected mobile robots MR.

In a preferred embodiment, the mobile robot MR is operated and controlled fully autonomously by control instructions which are generated locally on the mobile robot MR. Each or selected mobile robots MR comprise a decentralized or distributed control unit DCU which interacts locally with a sensor system S. The sensor system S may comprise fist sensors S1 for coordinated navigation and second sensors S2 for gripping. The second sensors may be part of the optical sensor vision system OSV.

The distributed control unit DCU interacts with the gripping and movement unit G for controlling a gripping and/or clamping task thereof. The distributed control unit DCU may optionally further interact with a control unit of the working table WT in order to synchronize movement (not shown in FIG. 9). The sensor system S and/or the distributed control unit DCU interact with the navigation system, which also may be at least partially provided locally on the mobile robot MR for calculating a transportation trajectory for the mobile robot in relation to the other mobile robots of the fleet. The distributed control unit DCU may have a plan interface I for receiving a cutting plan and/or a sorting plan. Usually the distributed control unit DCU will additionally be provided with a network interface NWI to a communication network, in particular for communication with the other robots MR of the fleet for synchronization. The distributed control unit DCU is adapted to execute a consensus algorithm for providing cooperative behavior on a common task.

Preferably, the distributed control unit DCU is adapted to execute the consensus algorithm, the sorting plan algorithm, the walking motion algorithm (or the stigmergy algorithm) and/or the coordinate navigation algorithm and the allocation algorithm. In other embodiments, at least some of the algorithms may be transferred to a central control unit CCU, which usually has more processing resources.

In a preferred embodiment, at least two mobile robots MR are used.

The mobile robot MR has an optical sensor system, which is used to estimate their position in the space. Further, the optical sensor system is used to detect cut parts P. The sensor system S of the mobile robot MR is preferably used to automatically detect navigation geometries (e.g. cutting grate pins, cut part elements, conveyor belts etc.).

The sensor system S of the mobile robot MR may preferably also be used to detect navigation geometries conditions (e.g. cutting grate pins being worn out, dirty etc). With this, the processing may be optimized in order to differentiate between failures (part P to be rejected) and good parts (without failures). Defective or faulty parts P need not to be sorted and are automatically excluded from being sorted.

Generally, the interfaces can be embodied as a hardware interface or as a software interface (e.g. PCI-Bus, USB or Firewire). In general, the control unit CCU, DCU can comprise hardware elements and/or software elements, for example a microprocessor, a field programmable gate array (an acronym is "FPGA") or an application specific integrated circuit (an acronym is "ASIC"). The memory in the control unit CCU, DCU can be embodied as non-permanent main memory (e.g. random-access memory—RAM) or as permanent mass storage (e.g. hard disk, USB stick, SD card, solid state disk).

The network NW or communication channels can be realized as a LAN (acronym for "local area network"), in particular a Wi-Fi network, or any other local connection, e.g. via Bluetooth, ZigBee or USB (acronym for "universal serial bus"). The network can also be realized as a WAN (acronym for "wide area network"), in particular the network can be identical with the internet and may be based on an IP protocol. The network can alternatively also be realized as a VPN (acronym for "virtual private network") or Lora WAN (Long Ranged Wide Area Network).

The control unit DCU, CCU may be provided as software and may be stored in a memory, which may be database or can be contained in a memory of a server, or it can be stored on a separate storage unit.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The system for secure and remote update of a control device in accordance with the method as described above can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Processes or steps, which have been described with respect to FIG. 7 are computer-implemented and may be embodied as software and/or hardware. At least some steps of the present invention may also be practiced in distributed computing environments where tasks are performed by remote processing devices linked through a communications network NW. In a distributed computing environment, program modules may be located in local and/or remote memory storage devices.

The control unit CCU, DCU may execute machine-executable instructions to effect one or more aspects of the present invention. At least a portion of the machine executable instructions may be stored (temporarily or more permanently) on the storage devices and/or may be received from an external source via an input interface.

Any reference signs in the claims should not be construed as limiting the scope.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantageous which are described with respect to a particular embodiment of present invention or with respect to a particular figure are, wherever applicable, also advantages of other embodiments of the present invention.

The invention claimed is:

1. A legged mobile robot (MR) of a fleet of interacting autonomous legged mobile robots (MR), for sorting processed parts (P) of a workpiece (W), which has been processed by a workpiece processing machine (L) with:

a control unit (DCU, CCU), which is configured for providing control instructions for controlling the mobile robot (MR), wherein a set of robot-specific control instructions is generated autonomously and locally on each of the mobile robot (MR) of the fleet of robots for the respective mobile robot (MR) for gripping processed parts (P) from a working table (WT) and for transporting the gripped processed parts (P) to a target destination in a cooperating manner;

a sensor system (S) with first sensors (S1) for coordinated navigation with other mobile robots (MR) of the fleet and with second sensors (S2) for gripping;

a network interface (NMI) to a network (NW) for communication with other mobile robots; (MR) and a gripping and movement unit (G) for gripping at least one processed part (P) from the working table (WT) and for moving the mobile robot (MR) for sorting the gripped processed part (P) to a target destination.

2. The legged mobile robot (MR) according to claim 1, wherein the mobile robot (MR) is legged and wherein the gripping and movement unit (G) comprises at least four legs (L), wherein each leg (L) may be provided with a tool of a set of different tools.

3. The legged mobile robot (MR) according to claim 2, wherein at least a part of the legs (L) of the gripping and movement unit (G) are configured to move the mobile robot (MR) and to grip and carry cut parts (P) and to fixate the mobile robot (MR) in a stable position.

4. The legged mobile robot (MR) according to claim 1, wherein the gripping and movement unit (G) comprises clamping means (Cl) for engagement with a grate-like support element (E) of the working table (WT) for securely positioning the mobile robot (MR) in a stable position on the working table (WT) and/or to fixate it thereon.

5. The legged mobile robot (MR) according to claim 4, wherein the grate-like support element (E) comprises a tooth.

6. The legged mobile robot (MR) according to claim 1, wherein the sensor system (S) of the mobile robot (MR) comprises an optical sensor vision system (OSV).

7. The legged mobile robot (MR) according to claim 1, wherein the control unit (DCU, CCU) is adapted to calculate a center of gravity of the mobile robot (MR) while gripping the processed parts (P) and for providing tilt avoidance control instructions to avoid tilting/tipping of the mobile robot (MR).

8. The legged mobile robot (MR) according to claim 1, wherein the mobile robot (MR) comprises a charging port (CP).

9. The legged mobile robot (MR) according to claim 8, wherein the charging port (CP) is a wireless charging port.

10. The legged mobile robot (MR) according to claim 1, wherein the gripping and movement unit (G) comprises three separate units: a gripping unit (GU), a movement unit (MU) and clamping means (Cl).

11. The legged mobile robot (MR) according to claim 10, wherein the gripping and movement unit (G) comprises suction cups (SC).

12. The legged mobile robot (MR) according to claim 11, wherein the suction cups (SC) comprises vacuum suction cups.

13. The legged mobile robot (MR) according to claim 11, wherein the gripping unit (GU) of the gripping and movement unit (G) comprises the suction cups (SC).

14. A sorting system (SortS) for sorting processed parts (P) from a workpiece (W), which has been processed by a workpiece processing machine (L) comprising:

a working table (WT) for supporting the workpiece (W) with the processed parts (P), which have been processed by the workpiece processing machine (L), a fleet of interacting autonomous legged mobile robots (MR) for sorting the processed parts (P) in a collaborative manner to a target destination, each of the legged mobile robots (MR) comprising:

a control unit (DCU, CCU), which is configured for providing control instructions for controlling the mobile robot (MR), wherein a set of robot-specific control instructions is generated autonomously and locally on each of the mobile robot (MR) of the fleet of robots for the respective mobile robot (MR) for gripping processed parts (P) from a working table (WT) and for transporting the gripped processed parts (P) to a target destination in a cooperating manner;

a sensor system (S) with first sensors (S1) for coordinated navigation with other mobile robots (MR) of the fleet and with second sensors (S2) for gripping;

a network interface (NMI) to a network (NW) for communication with other mobile robots; (MR); and a gripping and movement unit (G) for gripping at least one processed part (P) from the working table (WT) and for moving the mobile robot (MR) for sorting the gripped processed part (P) to a target destination.

15. The sorting system (SortS) according to claim 14, directed to the sorting system, wherein the sorting system (SortS) comprises a central control unit (CCU) for at least partially coordinating the control of the sorting process and wherein all or a selected set of the mobile robots (MR) are/is equipped with a control interface to the central control unit (CCU).

16. The sorting system (SortS) according to claim 14, wherein the sorting system (SortS) is controlled by a system of distributed control units (DCU), which are provided locally on the autonomously operating mobile robots (MR).

17. The sorting (SortS) according to claim 14, wherein at least two mobile robots (MR) exchange collaboration messages for building a cooperating team of mobile robots by applying a consensus algorithm for cooperating behavior, wherein the collaboration messages comprise a collaboration request message set, an availability response message set, an initialization message set and a synchronization message set.

18. The sorting system (SortS) according to claim 14, wherein the sorting system (SortS) comprises at least one ramp (R) for facilitating the movement of the mobile robots (MR) to and from the working table (WT).

19. The sorting (SortS) according to claim 14, wherein the sorting system (SortS) comprises a plan interface (I) for receiving a cutting plan or a sorting plan and wherein the plan interface (I) is implemented on all or a selected set of the mobile robots (MR).

20. The sorting system (SortS) according to claim 14, wherein the sorting system (SortS) comprises a navigation system (NS) and wherein at least a part of the navigation system (NS) is implemented on all or a selected set of the mobile robots (MR).

21. A method for operating a sorting system (SortS) comprising:

a working table (WT) for supporting the workpiece (W) with the processed parts (P), which have been processed by the workpiece processing machine (L), a fleet of interacting autonomous legged mobile robots (MR) for sorting the processed parts (P) in a collaborative manner to a target destination, each of the legged mobile robots (MR) comprising:

a control unit (DCU, CCU), which is configured for providing control instructions for controlling the mobile robot (MR), wherein a set of robot-specific control instructions is generated autonomously and locally on each of the mobile robot (MR) of the fleet of robots for the respective mobile robot (MR) for gripping processed parts (P) from a working table (WT) and for transporting the gripped processed parts (P) to a target destination in a cooperating manner;

a sensor system (S) with first sensors (S1) for coordinated navigation with other mobile robots (MR) of the fleet and with second sensors (S2) for gripping;

a network interface (NMI) to a network (NW) for communication with other mobile robots; (MR) and a gripping and movement unit (G) for gripping at least one processed part (P) from the working table (WT) and for moving the mobile robot (MR) for sorting the gripped processed part (P) to a target destination, the method comprising generating autonomously and locally on each of the mobile robots (MR) of the fleet of robots for the respective mobile robot (MR) a set of robot specific control instructions for gripping processed parts (P) from the working table (WT) and for transporting the gripped processed parts (P) to a target destination in a cooperating manner.

22. The method according to claim 21, wherein each of the mobile robots (MR) is exchanging messages with each other for informing the other mobile robots (MR) of the own control instructions and/or for being informed about the foreign control instructions of the other mobile robots (MR).

23. The method according to claim 21, wherein the method comprises to receive a cutting plan and/or a sorting plan from the processing machine (L), in particular a cutting machine and generating the set of control instructions in reply to the received cutting plan or sorting plan.

24. The method according to claim 21, wherein for controlling navigation of the fleet of mobile robots (MR) neural networks are used and/or evolutionary computation techniques are applied.

25. The method according to claim 21, wherein each mobile robot (MR) of the fleet of mobile robots exchanges messages in order to enable cooperative acting within the sorting process.

26. The method according to claim 25, wherein a mobile robot (MR) generates a job order message to be distributed to all mobile robots of the fleet in case the robot is not able to execute or complete its task according to the received control instructions.

27. The method according to claim 21, wherein each mobile robot (MR) of the fleet of mobile robots uses a coordinate navigation algorithm (NS) for calculating its movement path dynamically in a changing environment including changes due to movements of other robots or already sorted parts, wherein a navigation process is continuously optimized and wherein optimization consists of an iterative improvement of the currently best solution.

28. The method according to claim 27, wherein the coordinate navigation algorithm (NS) comprisies a stigmery algorithm.

29. A computer program product comprising program elements which cause a processor in each autonomous legged mobile robot (MR) of a fleet of interacting autonomous legged mobile robots (MR), within a sorting system (SortS) for sorting processed parts (P) from a workpiece (W), to carry out steps of a method for sorting the processed parts (P) when the program elements are loaded into a memory of the processor, the method comprising:

generating autonomously and locally on each of the mobile robots (MR) of the fleet of robots for the respective mobile robot (MR) a set of robot specific control instructions for gripping processed parts (P) from a working table (WT) of the sorting system (SortS) and for transporting the gripped processed parts (P) to a target destination in a cooperating manner, wherein the working table (WT) supports the workpiece (W) with the processed parts (P), which have been processed by the workpiece processing machine (L), and each of the legged mobile robots (MR) comprising:
 a control unit (DCU, CCU), which is configured for providing control instructions for controlling the mobile robot (MR), wherein the set of robot-specific control instructions is generated autonomously and locally on each of the mobile robot (MR) of the fleet of robots for the respective mobile robot (MR) for gripping processed parts (P) from the working table (WT) and for transporting the gripped processed parts (P) to the target destination in a cooperating manner;
 a sensor system (S) with first sensors (S1) for coordinated navigation with other mobile robots (MR) of the fleet and with second sensors (S2) for gripping;
 a network interface (NMI) to a network (NW) for communication with other mobile robots; (MR) and
 a gripping and movement unit (G) for gripping at least one processed part (P) from the working table (WT) and for moving the mobile robot (MR) for sorting the gripped processed part (P) to a target destination.

30. A computer-readable medium on which program elements are stored that can be read and executed by a processor, in order to perform steps of a method for sorting processed parts (P), when the program elements are executed by the processor, the method comprising:

generating autonomously and locally on each of the mobile robots (MR) of the fleet of robots for the respective mobile robot (MR) a set of robot specific control instructions for gripping processed parts (P) from the working table (WT) and for transporting the gripped processed parts (P) to a target destination in a cooperating manner, wherein the working table (WT) supports the workpiece (W) with the processed parts (P), which have been processed by the workpiece processing machine (L), and each of the legged mobile robots (MR) comprising:
 a control unit (DCU, CCU), which is configured for providing control instructions for controlling the mobile robot (MR), wherein the set of robot-specific control instructions is generated autonomously and locally on each of the mobile robot (MR) of the fleet of robots for the respective mobile robot (MR) for gripping processed parts (P) from the working table (WT) and for transporting the gripped processed parts (P) to the target destination in a cooperating manner;
 a sensor system (S) with first sensors (S1) for coordinated navigation with other mobile robots (MR) of the fleet and with second sensors (S2) for gripping;
 a network interface (NMI) to a network (NW) for communication with other mobile robots; (MR) and
 a gripping and movement unit (G) for gripping at least one processed part (P) from the working table (WT) and for moving the mobile robot (MR) for sorting the gripped processed part (P) to a target destination.

\* \* \* \* \*